United States Patent [19]

Belser

[11] 3,973,245

[45] Aug. 3, 1976

[54] METHOD AND APPARATUS FOR POINT PLOTTING OF GRAPHICAL DATA FROM A CODED SOURCE INTO A BUFFER AND FOR REARRANGING THAT DATA FOR SUPPLY TO A RASTER RESPONSIVE DEVICE

[75] Inventor: Karl Arnold Belser, San Jose, Calif.

[73] Assignee: International Business Machines Corporation, Armonk, N.Y.

[22] Filed: June 10, 1974

[21] Appl. No.: 477,717

[52] U.S. Cl. .......................... 340/172.5; 340/324 AD
[51] Int. Cl.² ............................................ G06F 3/14
[58] Field of Search ...... 340/172.5, 324 A, 324 AD; 178/6, 6.8, 7.7

[56] References Cited

UNITED STATES PATENTS

| | | | |
|---|---|---|---|
| 3,631,455 | 12/1971 | Gregg | 340/324 A |
| 3,668,661 | 6/1972 | Cull et al. | 340/172.5 |
| 3,675,232 | 7/1972 | Strout | 340/172.5 X |

OTHER PUBLICATIONS

Sherr, "Applications . . . to Command and Control", *Proceedings of the Society for Information Display*, vol. 11, No. 2, 1970, pp. 61–70.

*Primary Examiner*—Jerry Smith
*Attorney, Agent, or Firm*—R. B. Brodie

[57] ABSTRACT

A method and apparatus for the point plotting and rearrangement of graphical data from a coded source into a buffer for raster type display. The execution of a graphic order in a stored program controllable graphics terminal are represented by a line generating a sequence of X Y coordinate values, which values are to be plotted or displayed. The points are plotted into a work organized memorv array in the form of topologically adjacent rectangular subarrays. These subarrays are then transformed into linear arrays. In order to conserve memory they directly replace the previous topologically adjacent subarrays in the memory. The linear arrays may then be accessed a word at a time and applied to the raster display.

7 Claims, 20 Drawing Figures

ARRAY OF DOTS SHOWING X,Y COORDINATES AND CORRESPONDING ADDRESSES OF A BIT ADDRESSIBLE MEMORY.

ARRAY OF DOTS SHOWING X,Y COORDINATES AND CORRESPONDING MEMORY ADDRESSES FOR A LINE FORMATTED WORD ORGANIZED RANDOM ACCESS MEMORY.

ARRAY OF DOTS SHOWING X,Y COORDINATES AND CORRESPONDING ADDRESS OF A RECTANGULAR AREA FORMATTED, WORD ORGANIZED, RAMDOM ACCESS MEMORY.

ARRAY DOTS GROUPED IN BLOCKS CONSISTING OF $MN^2$ DOTS COMING FROM N SEQUENTIALLY ADDRESS WORDS.

THE DOT (BIT) PATTERN WITHIN A BLOCK

A BLOCK SHOWN FOR WORDS IN LINE FORMAT WHERE A IS A MULTIPLE OF M·N

A BLOCK SHOWN FOR WORDS IN AREA FORMAT WHERE A IS A MULTIPLE OF M·N

BIT MAP OF POINTS TO BE PLOTTED

MEMORY IN LINE FORMAT

MEMORY IN AREA FORMAT

ADDRESS CONVERSION FOR LINE FORMAT

ADDRESS CONVERSION FOR AREA FORMAT

MEMORY IN AREA FORMAT
AFTER IMAGE ASSEMBLY

MEMORY IN LINE FORMAT
AFTER REARRANGEMENT

A DATA FLOW DIAGRAM FOR PERFORMING BUFFER REARRANGEMENT

THE PARTITION OF THE CONTENTS OF FORMAT CONVERSION LOGIC (REARRANGEMENT MEMORY) INTO M IDENTICAL SHIFT REGISTER ARRAYS SHOWN IN FIG.12.

ONE OF M IDENTICAL SHIFT REGISTER ARRAYS USED IN FORMAT CONVERSION LOGIC (THE REARRANGEMENT MEMORY)

METHOD AND APPARATUS FOR POINT PLOTTING OF GRAPHICAL DATA FROM A CODED SOURCE INTO A BUFFER AND FOR REARRANGING THAT DATA FOR SUPPLY TO A RASTER RESPONSIVE DEVICE

BACKGROUND OF THE INVENTION

This invention relates to a method and apparatus for the point plotting of a line resulting from the execution of graphic orders in a stored program controllable graphics terminal and the raster display thereof. More particularly, the invention relates to structures which tend to minimize the time required for generating the plotted points in an addressable buffer and their subsequent representation on a raster output device.

Devices for printing, scanning or displaying of graphic data are generally of two types, vector or raster. A vector device is capable of drawing or scanning by using a series of elementary movements in two dimension. If these movements are straight segments they are called vectors so that an image would be scanned or made up of a series of straight line segments under direct program control. In contrast, a raster device is driven by a predetermined scan pattern, which pattern exhaustively covers each point of the scan, print, or display area. If the scan pattern consists of an array of dots, generated first as dots per line and then as lines per page, then the pattern is deemed a "raster". For example, consider a cathode ray tube trace which starts at the upper left corner of the screen and scans to the right forming a line. The scan returns to the left edge and starts a second line one dot lower down upon the face of the screen. This is repeated until the whole screen area has been scanned.

The vector mode has been prevalent in many computer products in the past because programming of graphic orders for a terminal display is formulated using magnitude and direction information. Also, the conversion from vector to raster form requires substantial hardware, speed of operation of conversion, i.e., throughput, and raster input/output devices that have synchronous scanning characteristics.

Raster scanning and output are preferable for several reasons. First, the hardware is less expensive than similar vector mode devices. Second, the printing throughput is high for raster since the bit strings representing the raster are generated in a relatively fixed time and are independent of the image content. This latter is not true of vector devices. Third, raster devices represent images with higher degrees of resolution than that of vector mode devices due to the digital dot nature of raster displays. Fourth, raster devices can be driven at a higher information rate for a given resolution than can a vector mode device.

The fundamental problem in the use of raster output devices is the conversion of information from the coded form specified in the graphic orders of a stored program controllable processor into a matrix or raster. As mentioned above, vector mode operation is a convenient representational form used by programmers. Illustratively, one frequently used graphics program language based upon the vector mode of operation in the Graphic Subroutine Package for the IBM 2250. The 2250 is a stored program controlled directed beam display. Also, Newman and Sproull, "Principles of Interactive Computer Graphics", McGraw Hill Book Co., 1973, pp. 485–501, contains an example of a high level graphics programming language of the Algol 60 type.

In order to drive a raster responsive device from vector mode instructions, the implicit form of the vector mode command (draw line: $X_1$ $Y_1$; $X_2$ $Y_2$) must be converted into an explicit dot pattern that approximates as best as possible the true path of the line. This explicit dot pattern may be stored, for example, in a random access memory. Relatedly, the question arises as to whether points being plotted into the memory could be used to directly drive the raster output device rather than having to wait until all the points have been assembled into the memory. Operatively, it has been found desirable to assemble an entire image prior to raster display because graphic orders contain no restriction on the order or direction of the vectors in the image. Thus, there is no way of reliably representing this information on a line at a time basis as the raster pattern is produced.

SUMMARY OF THE INVENTION

It is an object of the invention to devise a method and apparatus for converting information in coded form into a dot matrix or raster form. It is a related object to devise structures which tend to minimize the time required for generating the plotted points and their subsequent representation on a raster output device.

The satisfaction of the foregoing objects requires solutions to two problems. First, one should maximize the rate at which points can be plotted into a matrix memory array, which array is used to assemble and buffer an image for raster display. The second problem requires matching the data rate of information extracted from the memory to that necessary to drive the raster device.

If the memory is other than single bit addressable, then the mapping of information into the memory and the extraction of information from the memory each require different formats for this optimization to occur. This devolves in part from the desirability in input point plotting to represent line segments in standardized two-dimensional topologically adjacent formats, as for example, square subarrays. Advantageously, square subarrays capture several points defining a line segment and can, therefore, be plotted into the memory in one rather than several memory cycle times. Since the direction of a line segment may be assumed equally probable, then a square subarray would have a high expectation of direction insensitivity, thus capturing on the average several points for all vectors. On the other hand, in order to supply data to a raster device, the bits in each subarray must be aligned along a linear dimension suitable for raster accessing. It should be recognized that these two formats are by themselves incompatible. It is necessary, therefore, to map the data in the square array format into linear arrays. This is accomplished by mapping the bits constituting the same orthogonal vector, i.e., row or column, one from each of a set of topologically adjacent subarrays into a linear array. Therefore, the data is supplied at a fast enough periodic rate to the raster scanned device as well as maximizing the rate at which points may be plotted into the memory.

The invention will be more fully understood and other objects and advantages will become apparent from the following description of an illustrative embodiment of the invention taken in connection with the attached drawings in which:

FIG. 1A sets forth a first level logic embodiment for the point plotting of data into a buffer and for rearranging that data to drive a raster display device.

FIG. 1B relates to an inverse embodiment in which raster coded information is buffered and reformatted into square subarrays for conversion into coded data.

Figure 4A:
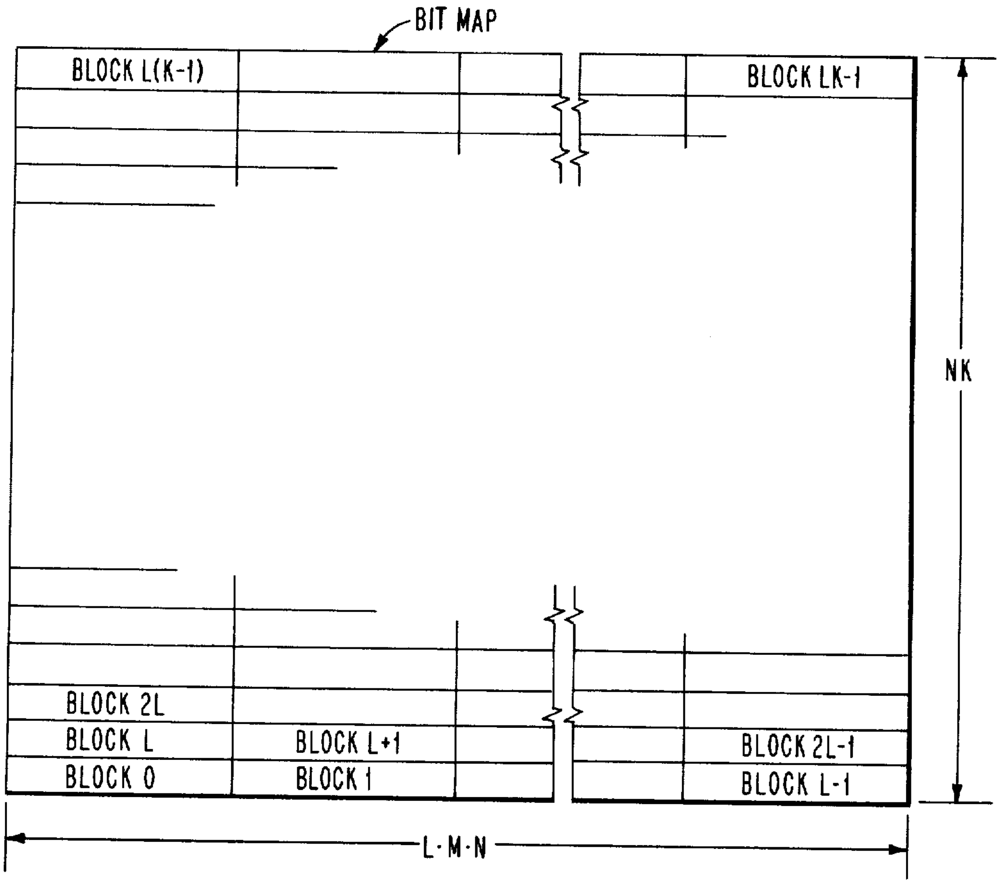

FIG. 4A exhibits the array of dots or points grouped in blocks consisting of $MN^2$ points, the points coming from N sequentially addressed words.

Figure 4B:
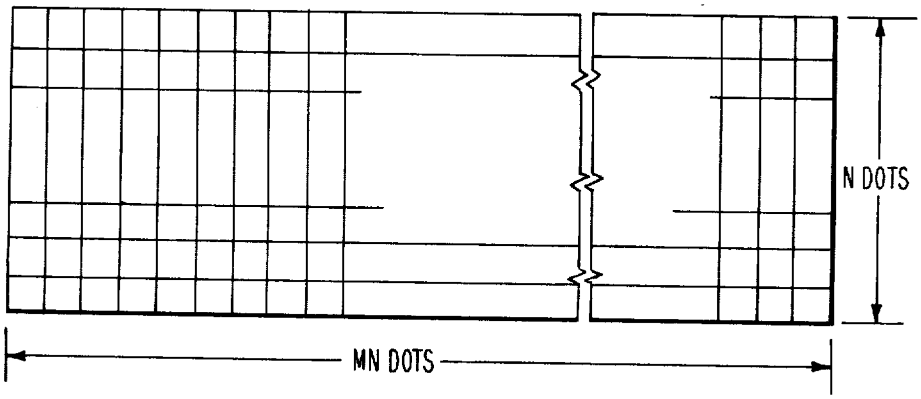

FIG. 4B illustrates the dot or bit pattern within a block.

Figure 5A:
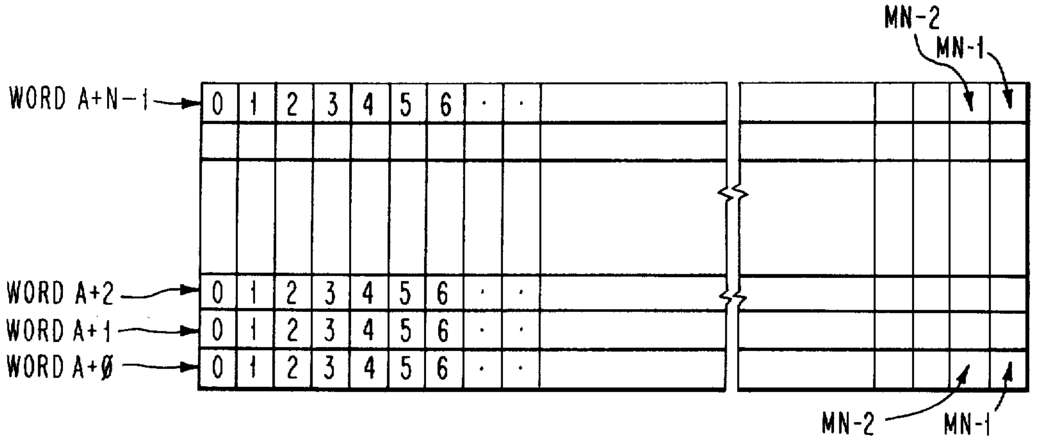
Figure 5B:
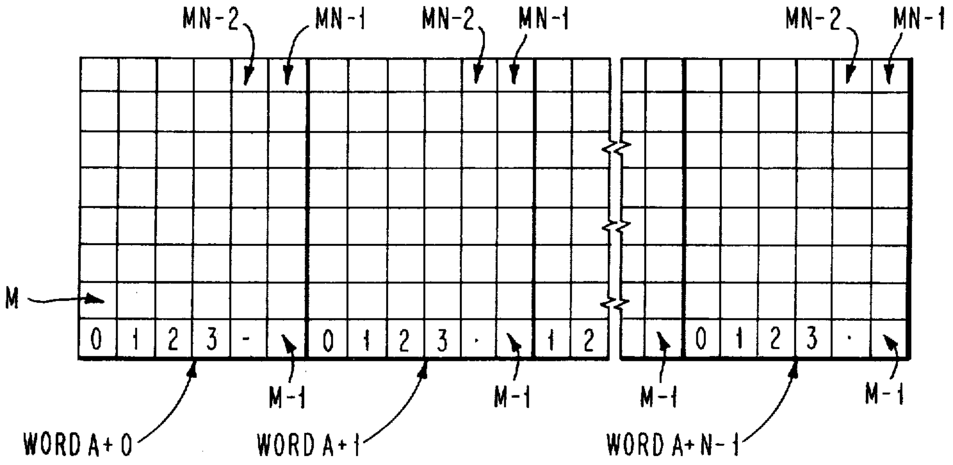

FIGS. 5A and 5B show blocks for words in line and area format, respectively, where the parameter A is a multiple of MN.

Figure 6A:
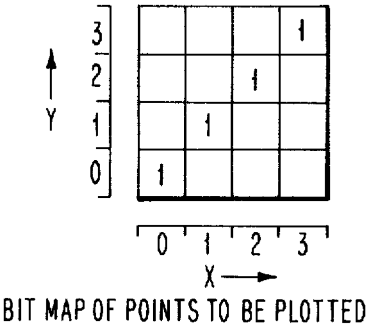
Figure 6B:
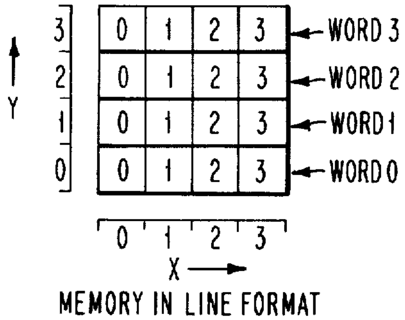
Figure 6C:
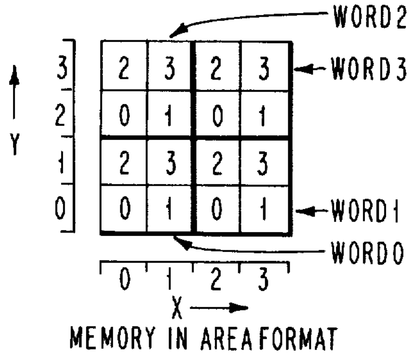

FIGS. 6A–C illustrate point plotting starting from a bit map of the points to be plotted and the counterpart address representations in memory using the line (6B) and area formats (6C), respectively.

Figure 7A:
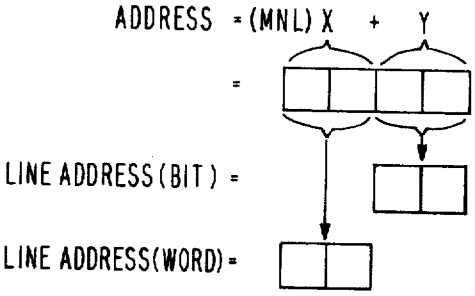
Figure 7B:
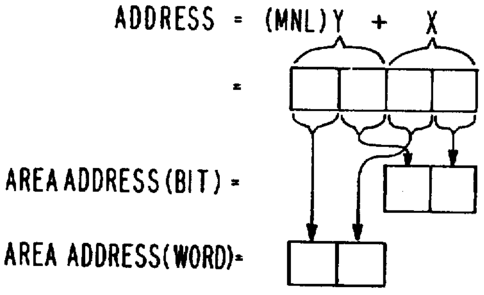

FIGS. 7A and 7B show the address conversion for line and area format, respectively.

Figure 8A:
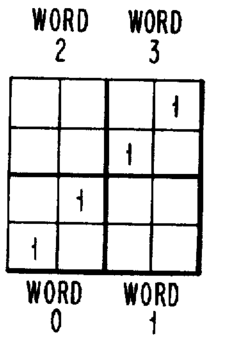

FIGS. 8A and B shows the random access memory 16 in "area" or subarray format and after rearrangement linear array (line) format.

Figure 1A:
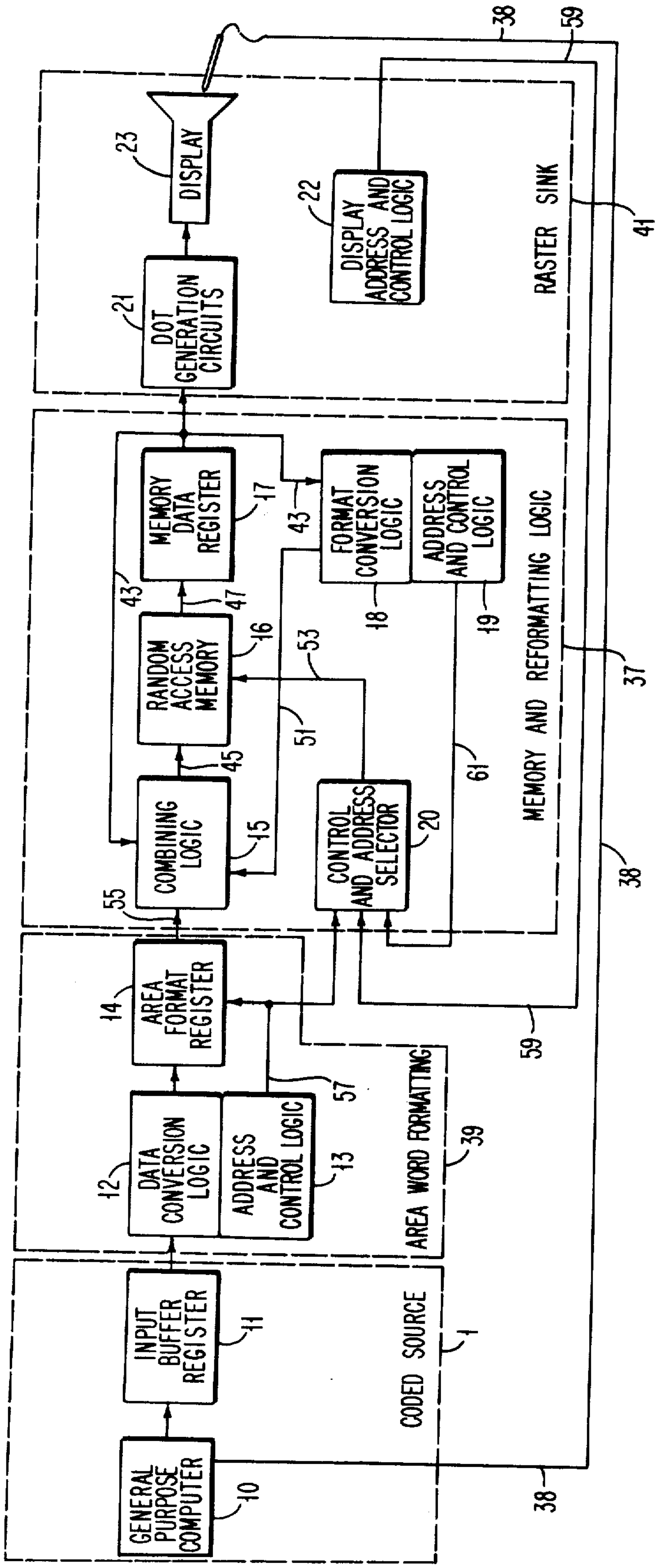
Figure 9:
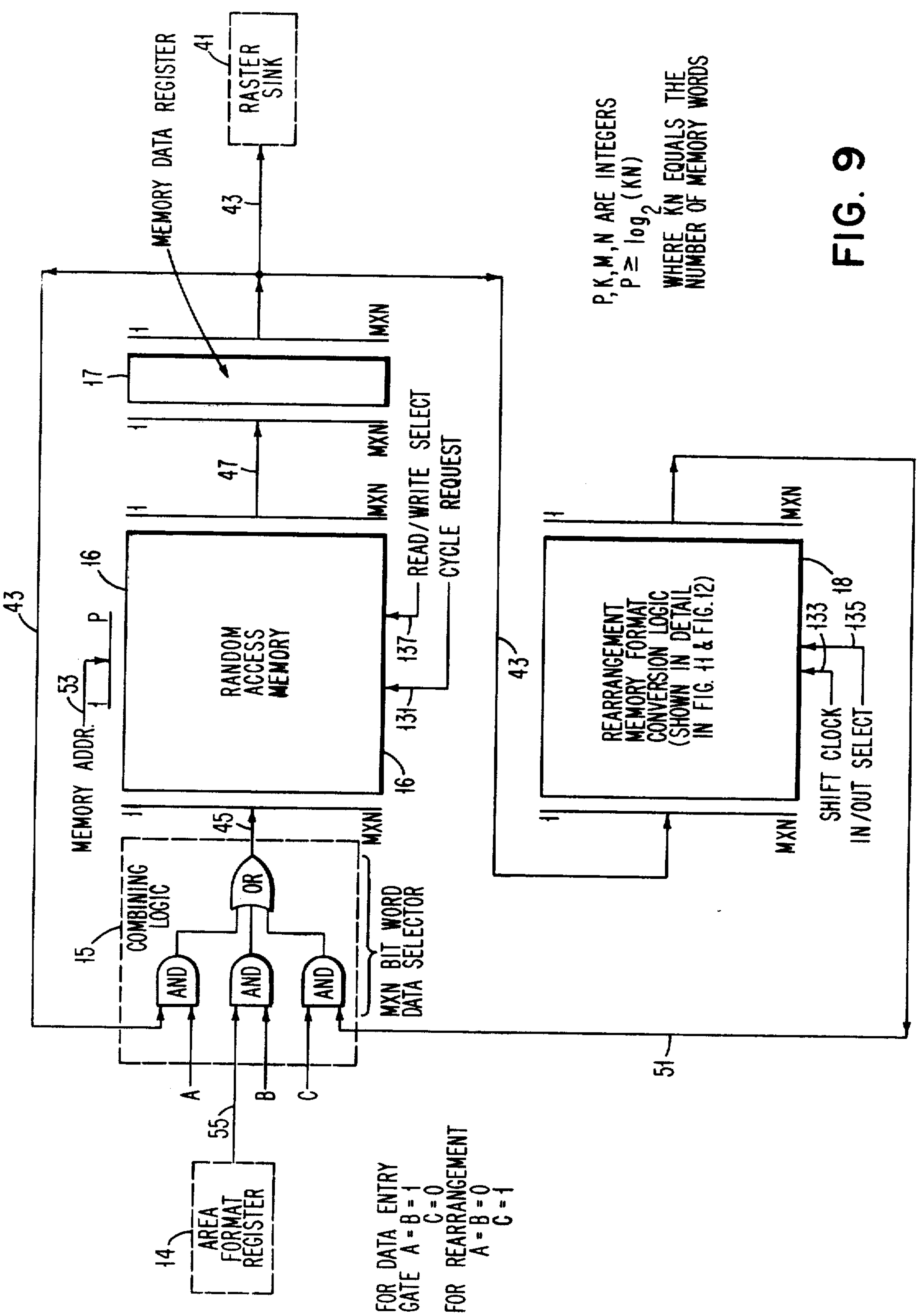

FIG. 9 is a logic diagram emphasizing the data flow for the memory and reformatting logic 37 of FIG. 1A.

Figure 10:
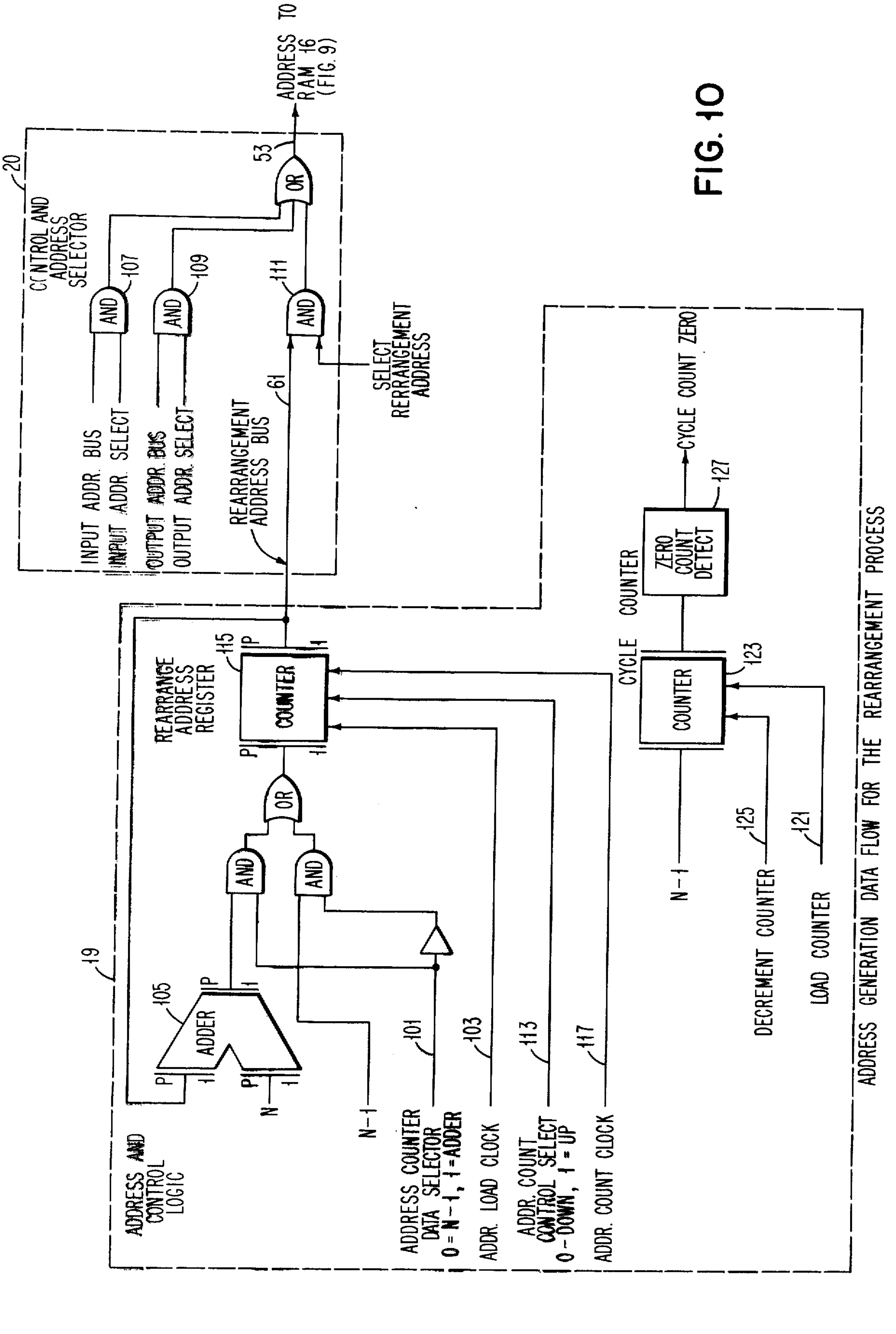

FIG. 10 sets forth the details of selector 20 and control logic 19 of FIG. 1A.

Figure 11:
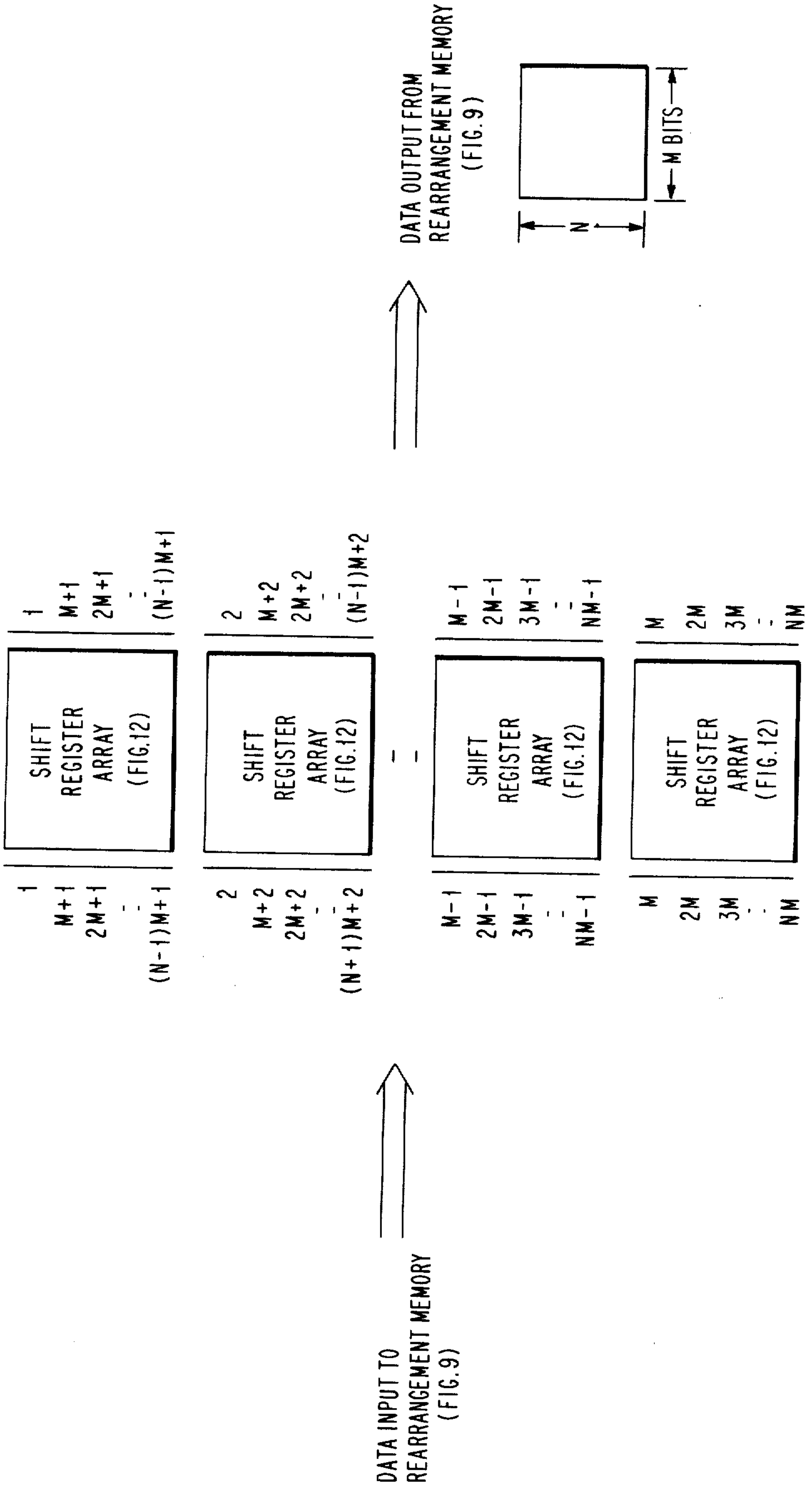

FIG. 11 exhibits the data transformations of format conversion logic 18 in FIGS. 1A and 9 suitable for shift register use.

Figure 12:
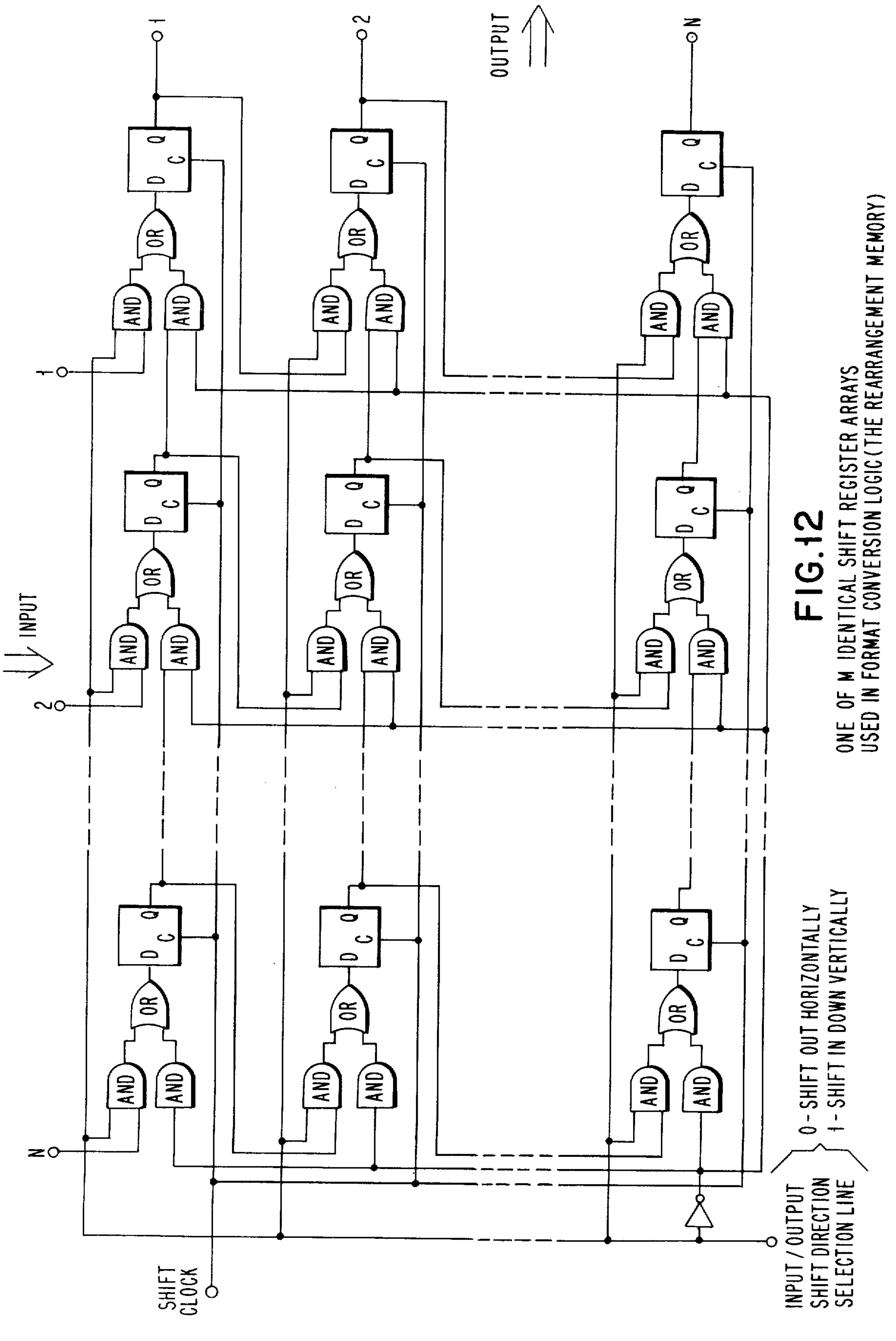

FIG. 12 shows a shift register array implementation for conversion logic 18.

DESCRIPTION OF THE PREFERRED EMBODIMENT

Point Plotting and Raster Generation

In order to plot a sequence of points corresponding to a line into a memory a sequence of memory addresses must be generated. A typical method for this address generation is the Bresenham algorithm for the generation of straight lines. References may be made to J. F. Bresenham "An Algorithm for Computer Control of a Digital Plotter", IBM systems Journal, Vol. 4, No. 1, 1965, pp. 22–30. In this algorithm a locus is approximated by a sequence of straight line segments. However, this algorithm is typical of the prior art in that segments are defined by a magnitude and a direction. They must be converted into an explicit bit pattern which can be held in a memory. Now suppose, one had a bit addressable memory, i.e., a memory with a one bit word. The memory is made to correspond to a two-dimensional bit map by associating the X and Y coordinate with certain regions of memory addresses. For example, a one million bit memory corresponds to a 1,024 by 1,024 bit square area or the image area of an 8½ × 8½ page having a resolution of 120 pels/inch. An address code of $2^{10}$ is needed to define each coordinate. Altogether this means that 20 bits of address are necessary to uniquely specify each bit. Now, once all of the vectors have been converted into an explicit bit pattern held in the memory, the vectors are said to be scan converted. The memory may now be used to drive a display by addressing the memory starting with points in the upper left hand corner of the X, Y image and accessing the memory a horizontal line at a time until the whole X, Y area has been accessed. The rate of point plotting into the memory and the rate at which a raster scan device can be driven is obviously limited by the amount of time it takes to either write each bit in or read each bit out from the memory, i.e., the limitation is that of memory cycle time.

It is evident that a high data rate is needed to supply synchronous display devices such as a cathode beam addressable display, i.e., a cathode ray tube (CRT). Illustratively, if a 1,024 by 1,024 bit image is sent to a CRT at the rate of 60 times per second, then the contents from the memory array would have to be read out at a bit data rate exceeding 60 million bits per second. This results in a memory cycle time requirement of something less than 16 nanoseconds. Such a memory is exceedingly costly in today's technology.

One approach of the prior art was that of accessing several bits in one memory cycle. For example, a 64 bit memory word could be accessed in one microsecond to give a sufficient data rate for a CRT refresh of the 1,024 by 1,024 bit image mentioned above. Such a memory is still a bit addressable memory but with a slow cycle time. Since the bits within a memory were topologically adjacent along horizontal dot rows of a bit map, the memory is said to be a line formatted memory. Because of this line format, it is able to supply bits to the raster display at the required rate. However, this in no way minimizes the point plotting time, i.e., time required to read in points representative of graphical coordinates (X, Y) into unique memory addresses.

Point Plotting, Raster Generation and Formats

How can one maximize the rate at which points may be plotted into the memory, given that it is possible that several bits may be accessed in each memory cycle. It is assumed that line segments may be of any length and in any orientation in a plane. Hence, the problem is a statistical one requiring that on an average, the point plotting rate for line segments of arbitrary orientation and position can be maximized if the bits of the memory word are made to correspond to nearly square rectangular areas of the bit map. Since the bits within a memory word are topologically adjacent in both the X and Y directions of the bit map, the memory is said to be an area formatted memory. The difficulty in maximizing the point plotting rate is that the two memory formats, the line format and the area format are different. That is, bits in the memory word corresponding to different locations in the X, Y map for each format.

The approach taken in this invention is to use a conventional memory, as for example, a word organized random access memory and rearrange (format convert) the data after point plotting is completed but before raster scanning begins. Significantly, the rearranging must be done as quickly as possible because it imposes an added delay resulting in a slower average point plotting rate.

The Conversion Apparatus in General

Reference is now made to FIG. 1A wherein an apparatus for point plotting of data in a buffer and for rearranging that data in order to supply a raster display is set forth. The apparatus includes a source of coded information such as a general purpose computer 10 for generating line segment information. Each line segment represents a sequence of X, Y coordinate values. Area word formatter 39 in response to the vector information, formats the vector or line segment into an area word, that is a square array of dots or points. At the same time an address representative of the points in the memory matrix array 16 is generated. The rearrangement or reformatting of the data from an area into linear arrays is accomplished by memory and reformatting logic 37. This logic arrangement in turn drives a raster sink 41. Because the system may be used with an interactive graphics terminal, a raster display 23 is shown coacting with a light pen, which light pen couples computer 10 over feedback path 38.

Figure 1B:
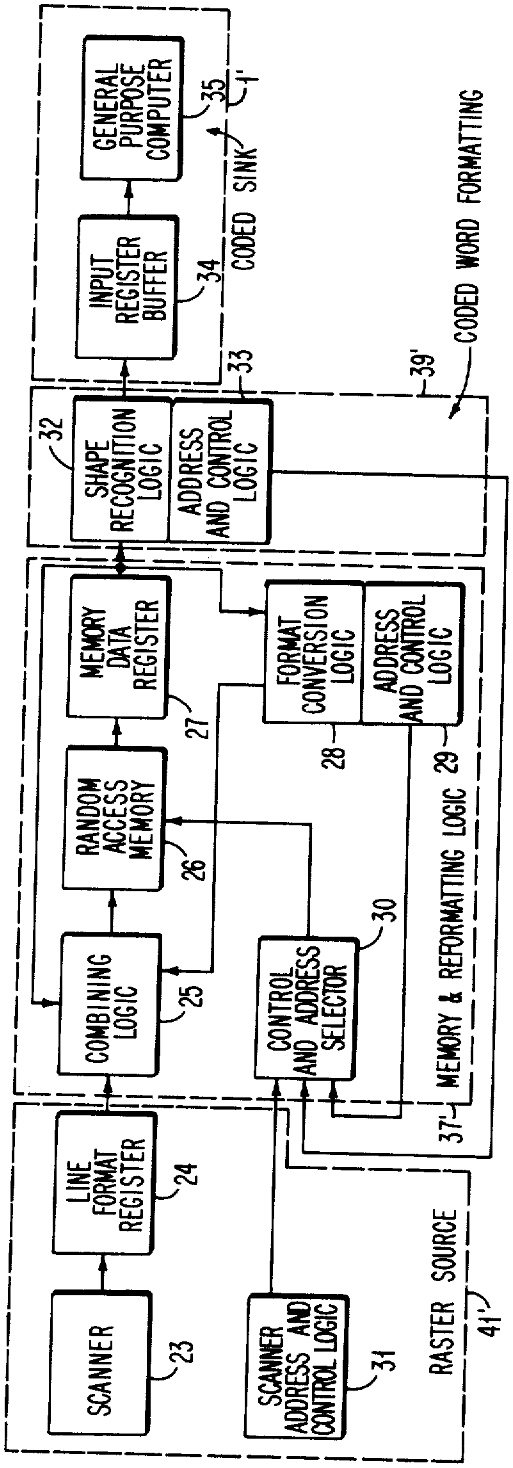

Referring now to FIG. 1B there is shown source 41' of raster coded data formed from a line scanning element 23 driving a memory and reformatting logic 37'. This logic converts linear arrays of raster data into area words (rectangular subarrays).

Point Plotting, Coordinating Mapping and Bit Memory Word Addressability

Central to the function of point plotting is that of bit addressability when the X, Y coordinates are plotted into rectangular subarrays or linear arrays (area and line format). This discussion will be used as a basis for explaining the reformatting algorithm in which topologically adjacent rectangular subarrays are transformed into linear arrays in random access memory 16. The discussion will start first with aspects of point plotting or address computation respectively for a bit addressable memory; a linear array; and for a rectangular subarray for word oriented random access memories.

Figure 2:
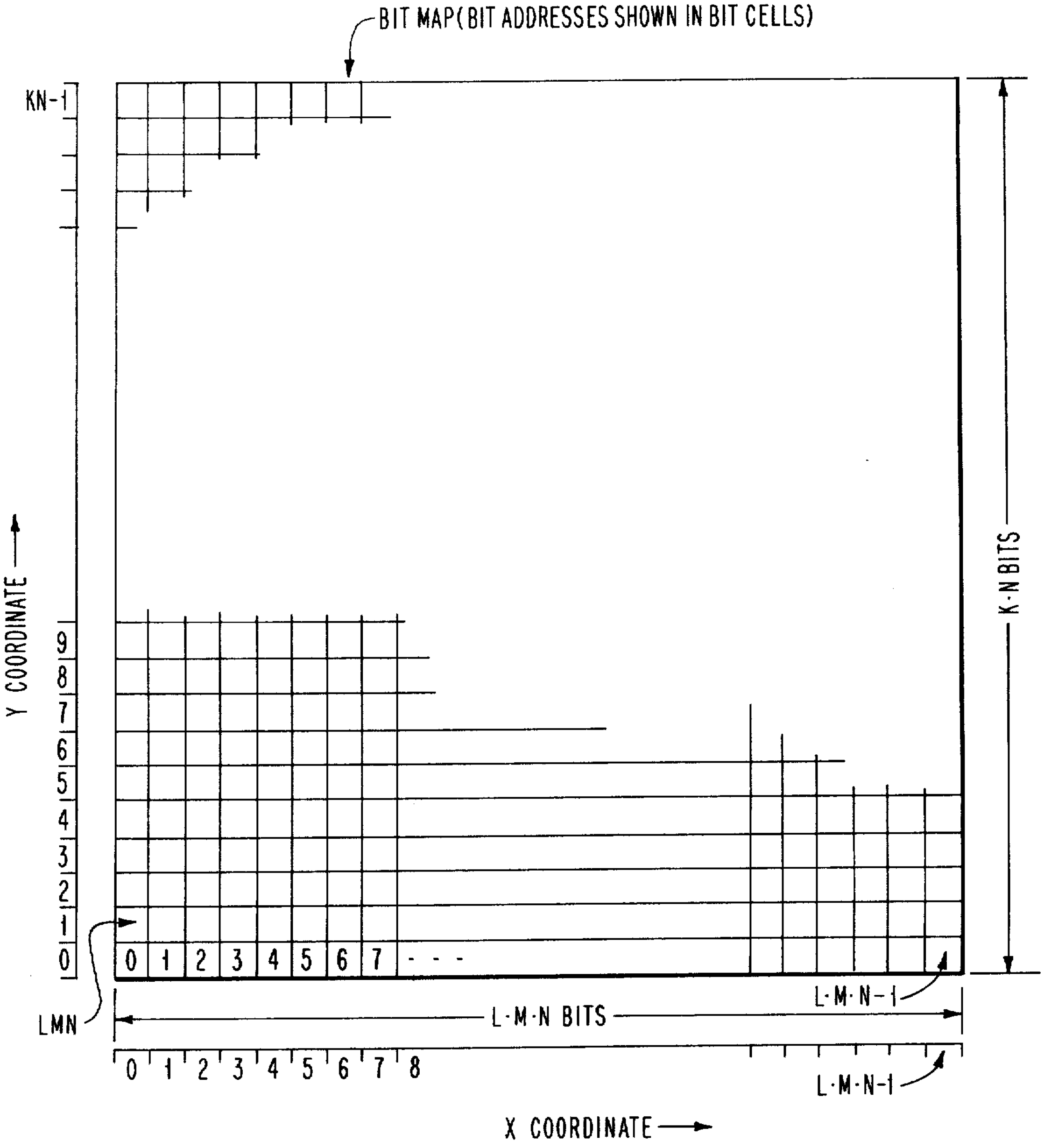
FIG. 2 illustrates a memory array of points or dots representing the X, Y coordinates and the corresponding addresses of a bit addressable memory.

Referring now to FIG. 2, there is shown a bit map for a bit addressable memory. The memory corresponds to an array of dots with LMN bits in the horizontal direction and KN bits in the vertical direction, K, L, M, N being integers. The product MN defines the size of the memory word used in the rearrangement algorithm. Note, it is possible to address each bit by an absolute number. The address of the lower left hand bit is zero with the lower right hand bit being designated LMN-1. Also, the left most bit in the second row from the bottom is LMN. The right most bit in the second row is 2LMN-1.

In addition to identifying each point in the array by an absolute number the bits can be addressed by an X, Y coordinate system. In the X, Y coordinate system the lower left hand bit in the array is designated as point 0,0. The lower right hand bit is 0, LMN-1. The left most bit in the second row is designated 1, 0, etc. From this one can derive a relation for generating memory addresses from coordinate pairs:

$$\text{memory address} = X + (LMN)\,Y$$

Where $LMN$ is a power of 2, then the multiplication by $LMN$ shifts the $Y$ bits to the left by a number of places equal to the power of 2.

Point Plotting, Coordinate Mapping and Line Memory Word Addressability

Figure 3A:
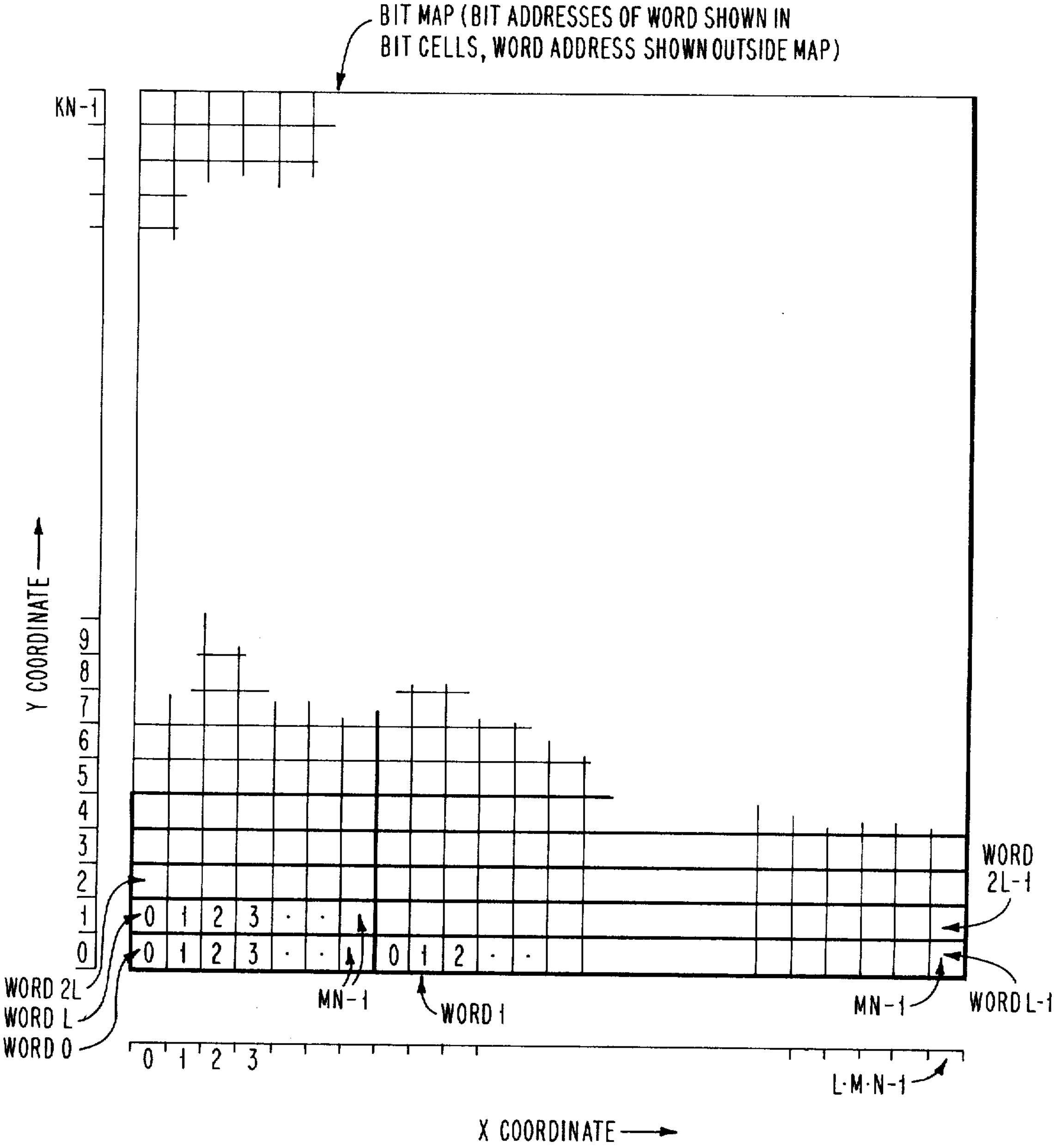
FIG. 3A is a memory map for a line formatted memory showing the points, their X, Y coordinates and their counterpart word organized memory addresses.

Referring now to FIG. 3A, there is shown a line format memory having the same bit map as that shown in FIG. 2. This memory map is made up of NKL memory words suitable for a word organized random access memory, where each word contains MN bits and is oriented along dot rows. The dark outlined rectangular areas are memory words and are labeled by their word addresses. The numbers inside the words are bit numbers. Thus, the lower left hand dot in the array of dots is bit 0 of word 0. The lower right hand bit is bit MN-1 of word L-1. The left most bit in the second dot row is bit 0 of word L, etc. These points correspond to X, Y coordinates of (0,0); (0, LMN-1); (1,0); respectively. The formulae for generating the word and bit addresses from coordinate pairs are:

$$\text{address (word)} = [X + (LMN)Y]_{MN} = \text{quotient of } [X + (LMN)Y]/MN$$

$$\text{address (bit)} = MOD_{MN}(X + (LMN)\,Y) = \text{remainder of } [X+LMNY]/MN$$

Note where $LMN$ is $2^k$ and the product MN is $2^{m+n}$, then the range of the addresses of the bits within a word will be from zero to $2^{m+n}-1$. This address may be represented by a $m+n$ bit binary number. For this case, the bit address is merely the lower $m+n$ bits of the binary representation of $X+2^kY$ and the word address is the remaining group of high order bits.

Point Plotting, Coordinate Mapping and Area Word (Subarray) Addressability

Figure 3B:
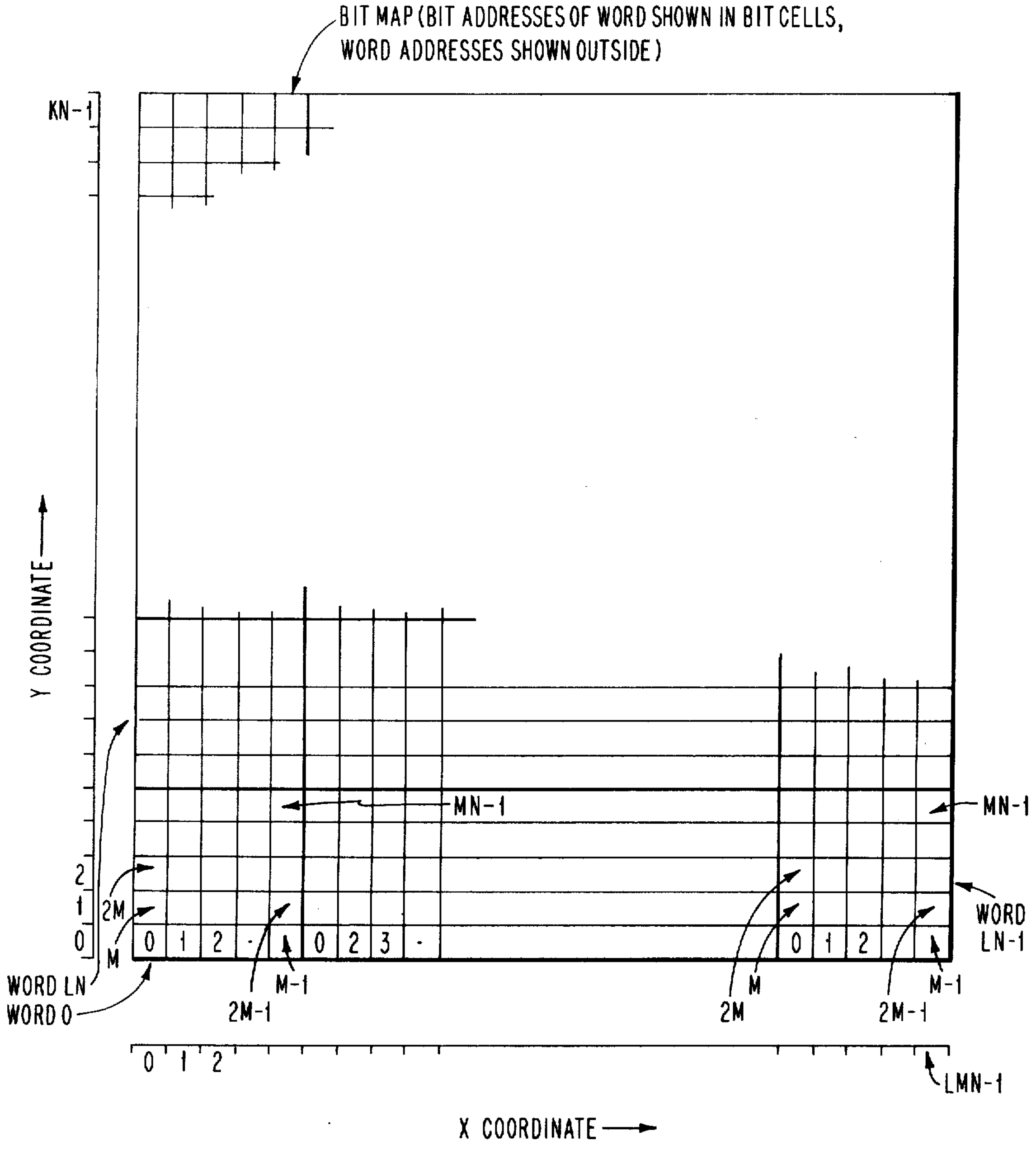
FIG. 3B is a memory map in which the array of points, their X, Y coordinates are incorporated in subarrays designated by corresponding addresses.

Referring now to FIG. 3B, there is shown the area word format having the same bit map as that shown in FIG. 2. This memory map is made up of NLK memory words where each words contains NM bits arranged in a rectangular array relative to the map such that there are M bits horizontally and N bits vertically. The dark outlined rectangular areas are memory words and are labeled by their addresses. The number inside the words are the bit numbers. Thus, the lower left hand bit in the array is bit 0 of word 0. The lower right hand bit is bit M-1 of word LN-1. Thus, the lower left hand is bit M-1 of word LN-1, the left most bit in the second dot now is bit M of word 0 and so forth. These points as before correspond to X, Y coordinates of (0, 0) (0, LMN-1), (1, 0) respectively. The formula for generating the word and bit addresses from coordinate pairs are as follows.

$$\text{Address (Word)} = [X]_M + LN[Y]_N$$

$$\text{Address (Bit)} = \text{Mod}_M(X) + M\ \text{Mod}_N(Y)$$

where $[X]_Y$ and $\text{Mod}_Y(X)$ are defined as before.

For the case where LNM is $2^k$, and MN is $2^{m+n}$ as before and now M is $2^m$ and N is $2^n$. The range of addresses of the bits within a memory word will still be 0 to $2^{m+n}-1$. Now, however, $m$ bits of the $m+n$ bit address will come from the X coordinate and $n$ bits will come from the Y coordinate. Specifically, the low order $m$ bits of the X coordinate will become the low order in bits of the bit address. Similarly, the low order $n$ bits to the Y coordinate will become the high order on bits of the bit address. The remaining bits of the X and Y coordinates make up the memory word address.

Point Plotting of Coded Graphical Data into a Buffer and Rearrangement in Raster Form as a Three Step Method It must be recalled that the overall object is the transfer of coded data representing line segments from a general purpose computer 10 to a display on a raster type output device 23 utilizing the principles of this invention. This is accomplished by the apparatus shown in FIG. 1A in three functional stages. The first stage is to convert the coded data into X, Y coordinates and map the coordinates into a random access memory 16. For this process the memory words are treated as being in an area or subarray format. The second stage is the conversion of topologically adjacent subarrays into linear array or line format. The last process is the accessing of the line formatted data by the raster display device. The following paragraphs are directed to a more detailed examination of these processes with reference to the embodiments of FIGS. 1A and 1B.

First Method Step

With respect to the first stage or process, coded data representative of pictorial information is read from computer 10 to buffer register 11. Data conversion logic element 12 transforms the coded data stored in register 11 into X, Y coordinates. These coordinates are to be mapped in appropriate locations in random access memory 16. In order to do this, it is necessary to draw a correspondence between memory words and rectangular sections or subarrays of an abstract coordinate mapping space. As a result each bit in the memory is one to one mappable into a point in the mapping space. The conversion of coordinate points into memory word and bit addresses is performed by address and control logic 13. Logic element 13 in effect computes an address according to the relationship described on page 12 lines 27–29. Each line generated by element 13 consists of two components, namely, a word address and a bit address. The addresses of the words reference random access memory 16 and correspond also to a subarray of the map. Each bit address is applied to the area format register 14. The word address is applied to the random access memory 16 through control and address selector 20. The mapping is accomplished by logically ORing bits representative or points into the area format register using the bit address component generated by control logic 13.

As long as the word address derived from the X, Y coordinate does not change, then the point to be plotted lies within the dimensions of the rectangular subarray and can, of course, be plotted in the area format register without accessing the random access memory 16. When the word address changes, then the point to be plotted lies outside the current subarray.

In order to map these points the current subarray contents must be saved. This is accomplished by first accessing the current contents of the memory at the same subarray position. The current contents in the memory and the area word to be saved are logically combined by conforming logic element 15 and entered into the memory 16 at the same area word (subarray) location. After the current contents of the area format register have been logically combined and entered into memory 16 then the register is available for mapping new coordinate points in another subarray. This process is continued until the points generated by the coded representation are exhausted.

The Second Method Step

The next step in the process is to reorder the contents of the memory such that it can be accessed in linear word format. It is a requirement of this process to conserve memory space. This is achieved by replacing subarrays by linear arrays prior to access by the raster display mechanism.

The question arises as to what is the smallest unit of data which can be conveniently rearranged within the constraints of the memory. It is recognized that the rearrangement of the memory from line to area or area to line format is done in groups of N memory words which together overlay a N dot high by MN dot wide portion of the array as illustrated, for example, in FIG. 4B. The N by MN section of the dot array is ccalled a "block" and is the basic rearrangement unit. The total dot array covered by these blocks is illustrated in FIG. 4A.

Referring now to FIGS. 5A and 5B, there is shown the line and area memory word formats overlaying the dot pattern of the block shown in FIG. 4B. The first memory word, as shown, has the address of A whichis a multiple MN. This insures that the blocks overlaying the dot array are as shown in FIG. 4A.

Rearrangement at the block level consists of the following operations:

1. Retrieving the N words from memory 16 into a local memory.
2. The taking of bits 0 to M−1 of each the words 0 through N−1, in that order, and writing them back into the memory as bits 0 to MN−1, respectively, into location A+0.
3. Taking bits M to 2M−1 of each of the words 0 through N−1, in that order, and the writing of them back into the memory as bits 0 to MN−1, respectively, into location A+1.
4. Repeating step 3 for locations A+2 through A+N−2.
5. Taking bits N (N−1) to MN−1 of each of the words 0 through N−1, in that order, and writing them back into the memory as bits zero to MN−1 respectively into location A+N−1.

If the block was in line format it will become area formatted. If the block was area formatted it will become line formatted. This process has to be done for each block in the memory in order for the rearrangement to be completed.

Referring again to FIG. 1A, the rearrangement of data in memory 16 is functionally executed by memory and reformatting logic 37. The local memory referred in the rearrangement process is designated as format logic conversion element 18. Such an element includes means for serializing the transformation or rearrangement as indicated, as for example, steps 1–5 above. Serialization implies both reading information into the element as well as extracting information from the element. The serialization of the reformatting step does not require arithmetic processing as that term is ordinarily understood, for example, matrix algebra. This function could also be achieved by a dual addressable memory as for example, that shown in W. Shooman, U.S. Pat. No. 3,277,449. However, the random access nature of matrix memory systems having vertical address capability is not necessary in this invention. The exact interaction between elements 15 to 18 in the reformatting operation will be subsequently described with reference to FIGS. 10–12.

Third Method Step — Linear Aray to Raster Line Accessing

The data now in memory 16 is formatted as horizontal line segments of the bit map shown, for example, in FIG. 2. In order to utilize data in this format, it is necessary to generate addresses that concatenate these horizontal line segments to form raster lines.

A raster consists of a sequence of X, Y coordinates starting at the upper left hand corner of the image and incrementing firsts X by 1 until the first row of dots has been addressed. This row is called a raster line. The X coordinate is then reset to the left most position of the bit map image and Y is incremented by 1. The X value is again incremented across the second row of dots. This is the second raster line. This process is continued raster line by raster line from the top of the image to the bottom until all dots of the image have been addressed. The formula for converting the X, Y coordinates for the raster into word addresses and bit addresses within the word for data in line format is given on page 12, lines 2–4. Since the data is in line format all of the data within one word will be addressed consecutively as the raster is generated. This minimizes the number of accesses to the memory for generation of raster data.

A Worked Out Example of the Method

Referring now to FIG. 1A together with FIGS. 6A–6C, the machine for practicing the method steps of reformatting data will be described. In FIG. 6A there is shown a bit map of points to be plotted. The plotting area for this example is a 16 dot array arranged in a 4 × 4 matrix. A diagonal line made of coordinate point pairs (0,0), (1,1), (2,2), (3,3) will be plotted.

The memory which will correspond to the 16 dot matrix shall consist of four words having four bits per word. Thus, the four by four dot array of FIG. 6A has a counterpart in FIGS. 6B and 6C within which the memory words superimposed upon the array for the memory is in line and in area format respectively. The memory word addresses are each labeled in FIGS. 6B and 6C. The numbers within the words are the bit addresses. The object then is to plot the four points from FIG. 6A into the memory organized in FIG. 6C and then rearrange the information into the format shown in FIG. 6B.

Referring to the previous section on addressing, the following correspondences are made:

1. The horizontal dimension of the dot array is LMN=4 where L=1, M=2, and N=2.
2. The vertical dimension of the dot array is KN=4, where K=2, and N=2.
3. The word dimension is MN=4, where N=2 and M=2. The horizontal width of the line word relative to the map is MN=4 and the height of the area word is N=2 and the width of the area word is M=2.

Point Plotting and Storage of Example

The addresses for each of the points may be calculated according to the formula for area word and bit addresses found on page 12, lines 27–29. The transformation from an X, Y coordinate point into an area word and bit address can be represented as follows:

(0,0) (0,0); (1,1) (0,3); (2,2) (3,0); and
(3,3) (3,3).

Referring to FIG. 6C the foregoing transformation may be pictorially verified.

The first point is plotted into the area format register 14. The next point to be plotted also lies in the same area word. It too must be entered into the area format register. The third point, however, lies in a different area word. It is thus necessary to store the current contents of the area format register in random access memory 16 prior to plotting this third point. To accomplish this storing the current contents of word zero to memory 16 are logically combined with the current contents of the area format register in combining logic 15. The combined result replaces the information stored in word zero. The area format register is then reset to zero and as with respect to the first two points the next two points are plotted into the area format register. When it becomes necessary to transfer the contents of register 14 to the memory the points are combined with the contents of area word 3 of memory 16 in the same manner as before.

The pictorial map of the memory content of the area format after image assembly is shown in FIG. 8A.

Reformatting of Example

Figure 8B:
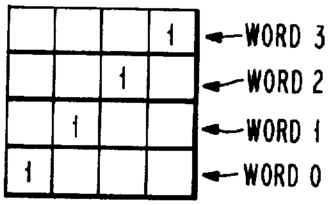

The memory must not be reformatted from area into line format. The results of the transformation is shown in FIG. 8B. As described in the previous section the arrangement is done using blocks. In this example there are two blocks. One consisting of word zero and one and the other consisting of words two and three.

Referring now to FIG. 1A, 6A, B and 8A and B, attention is directed to the area to line word transformation.

1. Words 0 and 1 are accessed from memory 16 and saved by format conversion logic 18 as block words 0 and 1, respectively.
2. Bits 0 and 1 of block word 0 and bits 0 and 1 of block word 1, in that order, are extracted from format conversion logic 18. The bits are concatenated to form a memory word which is written into word zero of memory 16.
3. Bits 2 and 3 of block word 0 and bits 2 and 3 of block word 1, in that order, are extracted from logic element 18. These bits are concatenated and written into bits 0, 1, 2 and 3 of memory word 1 in memory 16. This completes rearrangement of the first block.
4. Words 2 and 3 are accessed from memory 16 and saved in logic element 18 as block words 0 and 1, respectively.
5. Bits 0 and 1 of block word 0 and bits 0 and 1 of block word 1 from logic element 18, in that order, are concatenated and written to bits 0 to 3 of memory word 2 in memory 16.
6. Bits 2 and 3 of block word 0 and bits 2 and 3 of block words one saved in logic element 18 are concatenated and written into bits 0 to 3 of memory word 3 in memory 16. This completes rearrangement of the last block.

Extracting Reformatted Data Example for Raster Display

The memory data is now to be supplied to a raster scan device. The data has to be accessed in coordinate form as:

0, 0; 0, 1; 0, 2; 0, 3 for the first line, as
1, 0; 1, 1; 1, 2; 1, 3 for the second line, as
2, 0; 2, 1; 2, 2; 2, 3 for the third line, and as
3, 0; 3, 1; 3, 2; 3, 3 for the last line.

Using the conversion scheme shown in FIG. 7A, memory word and bit addresses are calculated for the third line of the raster with regard to the calculation reference should be made to the address formula set forth on page 12 line 2–4. Given the coordinate points for the third raster line the corresponding line word and bit addresses are as follows:

2, 0 2, 0; 2, 1 2, 1; 2, 2 2, 2; 2, 3 2, 3;

Referring to FIG. 6B, this address generation may be pictorially verified.

A Programmatic Exercise of the Apparatus

Referring now to FIGS. 9–12 there are shown detailed views of the memory and reformatting logic element 37. FIG. 9 discloses a data flow diagram for performing the reformatting or rearrangement of the data in random access memory 16. FIG. 10 sets forth the logical design for address and control element 19 as well as control and address selector 20. FIG. 11 constitutes an example of the partition of the contents of the format conversion logic into M identical shift register arrays. FIG. 12 evidences the form of one of the M identical shift register arrays used in the format conversion element 18. In order to appreciate the apparatus the following numbered sequential steps exercise the logic set forth in FIGS. 9–12 in order to perform memory format rearrangement. Reference should be made especially to FIGS. 9 and 10.

Steps 1–5 initialize the apparatus.

1. Set rearrangement address counter load data selector 101 to select the N–1 source.
2. Clock the load line 103 on the rearrange address counter 115 to load it with N-1. This will initialize counter 115.
3. Set the rearrangement selector 101 to select the adder source 105.
4. Set the control and address selector 20 to the memory 16 so that only the rearrange address is gated into memory 16. This means that 107 and 109 are closed and gate 111 is open.
5. Set the memory input data selector 15 so that only data from the rearrangement memory 18 may be gated through to memory 16. Thus, in FIG. 9, the And gates driven by lines A and B are off while the And gate driven by line C is on.

The following steps initialize the apparatus to read data from memory 16 and place it in rearrangement memory 18.

6. Set the count control 113 so that the rearrangement address in counter 115 becomes decremented when the count line 117 is clocked.
7. Set the rearrangement memory 18 and its in/out select line 135 such that data is shifted into the memory when the shift line is clocked.
8. Set the memory 16 read/write selector 137 such that data is read into the memory data register 17 when the cycle request line is clocked.
9. Clock the load line 121 for the cycle counter 123. In this regard FIG. 10 should be consulted.

The following steps transfer information from memory 16 to the rearrange memory 18.

10. Clock the memory cycle request line 131 which loads the memory data register 17 with data over path 43.
11. Clock the rearrange memory shift line 133. This line transfers data from register 17 to the rearrangement memory 18 over path 43.
12. Jump to step 16 if the cycle count zero line 127 is true. See FIG. 10.
13. Clock the rearrange address count line 117 in order to decrement the address in register 115 by 1.
14. Clock the cycle counter count line 125 in order to decrement the cycle count in register 123 by 1.
15. Jump to step 10.

The following steps initialize the apparatus to transfer the data from the rearrangement memory 18 to memory 16.

16. Set the count control line 113 so that the rearrangement address becomes incremented when the count line 117 is clocked.
17. Set the rearrangement memory select line 135 such that data is shifted out of memory 18 when the shift line 133 is clocked.
18. Set the memory read/write selector 137 such that data is written into the memory 16 from the data selector bus 45 when the cycle request line 131 is clocked.
19. Clock the load line 121 for the cycle counter 123.

The following steps write the data extracted from the rearrangement memory into memory 16.

20. Clock the memory cycle request line 131. This line loads the memory 16 with data from the rearrangement 18.
21. Clock the rearrangement buffer shift line 133. This presents a new word to the memory 16.
22. Jump to step 26 if the cycle count line 127 is zero.
23. Clock the rearrangement address counter clock line 117 in order to increment the address counter 115 by 1.
24. Clock the cycle counter count line 125 in order to decrement the cycle count in counter 123.
25. Jump to step 20.

The following steps initialize the system for the next rearrangement task if one is required.

26. Jump to step 29. If the last memory address in counter 115 is equal to KN-1.
27. Clock the rearrangement address count load line 103 in order to increment the address by N.
28. Jump to step 6.

In the situation where the operator desires to insert more data points to an pre-existing raster display, then it is necessary to reformat the entire display from line to area format. The entity is then rearranged as before from area to line.

It is to be understood that the particular embodiment of the invention described above and shown in the drawings is merely illustrative of, and not restrictive on the broad invention. The various changes in design, structure, and arrangement may be made without departure from the spirit of the broader aspects of the invention as defined in the appended claims.

What is claimed is:

1. An apparatus for the point plotting of graphical data from a coded source (1) into a word addressable memory (16) and for rearranging that data for supply from the memory to a raster responsive device (41), the coded data representative of line segments or other symbols in the form of a sequence of X, Y coordinate values, the apparatus comprises:

means (12, 13) for point plotting the coordinate values defining each line segment into a corresponding predetermined rectangular subarray (FIG. 1-14; FIG. 6A);

means (FIG. 1-15, 17, 43, 20; FIG. 3B; FIG. 5B; FIG. 6C) for storing of the given rectangular subarray into the memory (16) and for the formatting (13, 14) of a new rectangular subarray upon the point plotting of coordinate values dimensionally exceeding the previously generated subarray;

means (FIG. 1-18, 19, 17, 43, 51; FIGS. 3A, 6B, 10-12) for reformatting the rectangular subarrays in the memory into linear arrays by mapping the bits constituting the same row or column from each subarray of a set of topologically adjacent rectangular subarrays into a linear array, the counterpart linear arrays being reinserted into the memory; and means (FIG. 1-41, 22, 59, 20, 53) for extracting the linear arrays from the memory and serially applying them to the raster responsive device.

2. An apparatus according to claim 1, wherein the point plotting means comprise:

a register (14) for storing binary values representative of X, Y coordinate values within a standardized predetermined rectangular subarray;

means (12, 13) responsive to the X, Y coordinate values for generating a bit address corresponding to the point location within the subarray and for applying the bit address to the register; and means (12, 13, 57, 20, 53) for generating a word address for storage in the memory.

3. An apparatus according to claim 1, wherein the means for storing of the given rectangular subarray in the word addressable memory and the formatting of a new rectangular subarray comprises:

means (20, 53, 17, 43, 15) for first accessing the current contents of the memory at an address specified by the point plotting means and logically combining said memory contents with said predetermined subarray for reinsertion into the memory at the same word location.

4. An apparatus according to claim 1, wherein the subarray size is M×N containing bits 0 through MN−1 and wherein the means for reformatting the rectangular subarrays into linear arrays comprises:

means (FIG. 9-17) for retrieving N words (of word size MN) from the memory and transferring the words to the reformatting means (18);

means (FIG. 9-18, 51, 15; FIG. 10-19, 20; FIG. 11, FIG. 12) for mapping N bits (0-N−1) of each of the retrieved words 0 through N−1, in that order and writing them back into the memory as MN bits (0 to MN−1), respectively in location address A+0; for mapping the bits N to 2N−1 of each of the retrieved words 0 through N−1, in that order and writing them back into the memory as MN bits (0 to MN−1), respectively into location address A+1; the concatenation being repeated for the contents ultimately stored in memory locations A+2 through A+N−2; and finally for mapping bits N(N−1) to MN−1 of each of the retrieved words 0 through N−1, in that order and writing them back into the memory as bits 0 to MN−1, respectively into memory location A+N−1.

5. An apparatus according to claim 1, wherein the reformatting means includes means for replacing the rectangular subarrays by counterpart linear arrays in the memory.

6. A method for point plotting and rearranging graphical data from a coded source into a word addressable memory for supply to a raster responsive device, the coded data representative of line segments in the form of a sequence of X, Y coordinate values, the method comprising the steps of:

point plotting the coordinate values into a predetermined rectangular subarray;

storing the rectangular subarray into the memory; formatting a new rectangular subarray upon the point plotting of coordinate values dimensionally exceeding the previously generated subarray;

reformatting the rectangular subarrays in the memory into linear arrays by mapping the bits constituting the same row or column from each subarray of a set of topologically adjacent rectangular subarrays into a linear array, the counterpart linear arrays being reinserted into the memory; and extracting the linear arrays from the memory and serially applying them to the raster responsive device.

7. An apparatus for converting raster data into coded form comprising:

a word organized random access memory (FIG. 1B-26);

means (41′, 30, 25, 27) for raster coding information and storing in the memory in the form of linear arrays;

means (27-30) for reformatting the linear arrays into rectangular subarrays in the memory by mapping the bits from each linear array into its constituitive rows or columns of each set of topologically adjacent rectangular subarrays; and means (39′) for deriving an X, Y coordinate value for each array extracted from the memory.

* * * * *